June 6, 1967   G. F. HITT   3,323,566

CHUCKING DEVICE FOR LOG PROCESSING LATHES

Filed Oct. 22, 1964

INVENTOR.
GEORGE F. HITT
BY
Townsend and Townsend
ATTORNEYS

United States Patent Office 3,323,566
Patented June 6, 1967

3,323,566
CHUCKING DEVICE FOR LOG PROCESSING LATHES
George F. Hitt, 937 10th St., Arcata, Calif. 95521
Filed Oct. 22, 1964, Ser. No. 405,770
1 Claim. (Cl. 144—209)

This invention relates to a chucking device and more particularly to one adapted for rapid engagement and disengagement on the driving and driven heads of log processing lathes and which automatically locks itself in position when the driving head is rotated in a direction for processing the work.

In the use of certain log processing lathes, irregularly shaped logs are mounted between ends and power rotated in order to peel the logs or cut off thin sheets of wood along their entire length for manufacture of veneer or plywood.

In such processing, a spindle or rotating head may be provided having a chuck mounted thereon capable of frictionally engaging the log at one end and rotating it in a given direction for working by the appropriate cutting tools. Typically, the holding elements on the face of such a chuck consist of sharp, wedge like protrusions spaced about its outer annular section in order to grasp logs of a given range of diameters. Ordinarily two ranges of sizes of logs are usually accommodated by means of an outer chuck relatively permanently mounted around an inner chuck; each chuck with its frictional engaging means being capable of handling one range of sizes of logs. However, logs may be encountered from large old growth with diameters far greater then even the normal average outer chuck can accommodate, and such logs with the hearts or centers rotted out provide no inner body by which either diameter chuck may frictionally engage them for rotating.

Thus an object of this invention is to provide an easily removable auxiliary chuck adapted for rapid mounting on a lathe spindle, or smaller diameter chuck, in order to accommodate large work diameters and comprising a self locking and sliding attachment which permits rapid engagement and/or disengagement from one or a series of concentrically fitted chucking members. The auxiliary chuck of this invention has been employed in practice for turning of logs to 84″ in diameter.

It is a further object of this invention to provide a chuck for attachment to a smaller rotating member wherein a boss on one of the two members slides into a slot on the other, the slot being formed in a curved shape arranged to lock the parts together so long as the chuck is being rotated in the direction for turning the work to be processed. The members are then easily separated when one member only is turned relative to the other in the direction of work rotation and then moved axially relative thereto a short distance.

Other objects, features and advantages of this invention will become apparent from a reading of the foregoing detailed description which shows one satisfactory embodiment of my invention adapted for use with spindles and chucks on lathes utilized in the timber and log processing industry.

Turning now to the drawings.

Figure 1:
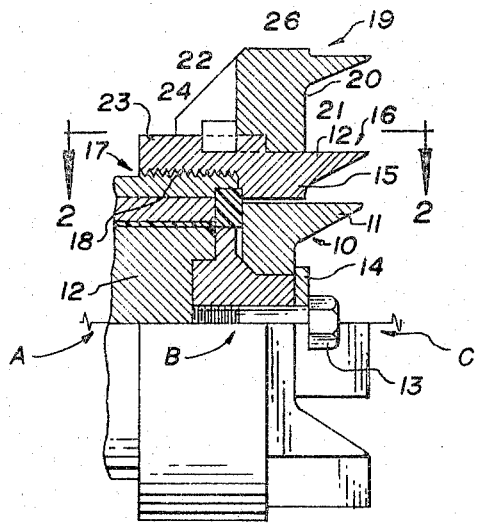
FIGURE 1 is a fragmentary partial section and side elevation of a typical log handling lathe spindle provided with two chucks and a chuck utilizing my invention mounted thereon.

The invention is best understood by referring to the accompanying drawing wherein at FIGURE 1 a lathe spindle is indicated generally at A and is connected to the rotating head of a log veneering lathe, the latter elements being known expedients in the art and not shown in the drawing. Central small diameter chuck 10 with wedge shaped frictional engaging teeth 11 is attached by means of cap screw 13 and flange washer 14 to the forward portion of the spindle body indicated generally at B. Intermediate diameter chuck 16 with wedge shaped frictional teeth 12 is threadably engaged to a peripheral portion of the spindle body by means of cooperating threads indicated generally at 17, said threads having a male portion on spindle A and a female portion along wall 18 of the counter bore of chuck 16. Chuck 16 is also bored out to have cylindrical inner wall 15 of a diameter that permits easy installation of chuck 16 over chuck 10. Chuck 11 and 16 exemplify known means to mount concentric chucks of varying effective holding diameters on a common spindle such as A.

Figure 3:
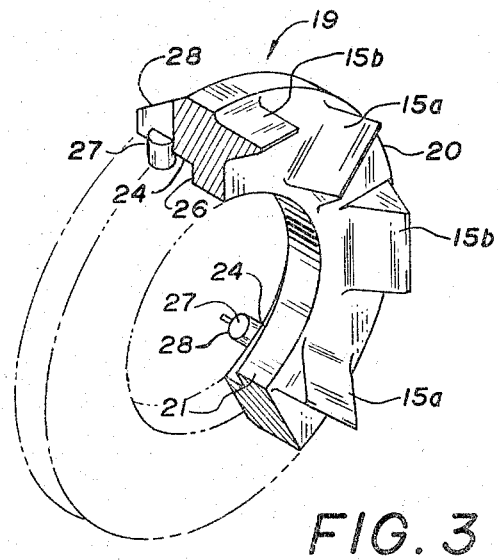
FIGURE 3 is a sectionalized perspective view showing a log-handling chuck embodying my invention.

Chuck 19, shown in FIGURES 1 and 3, is provided with wedge shaped teeth 15a and 15b on face 20 at right angle to axis C, and bored out along inner face 21 so that the entire chuck may fit over the forward portion of the outside diameter of chuck 16. Chuck 16 is provided with a shoulder 22 at its outer periphery which steps to its maximum diameter along wall 23. Chuck 19 correspondingly is counter bored to form inner cylindrical wall 24 and annular seat 25 which mate with and contact surface 23 and shoulder 22, respectively, when chuck 19 is mounted over chuck 16 as shown in FIGURE 1 and described in greater detail below.

As can best be seen by reference to FIGURE 3, chuck 19 is provided with three bosses 27 equally spaced around and radially protruding into the space defined by the counter bore identified by inner cylindrical wall 24. Bosses 27 may either be welded to the body of chuck 19, made integral therewith, or otherwise secured thereto. Each boss is additionally supported by gussets 28 which are secured at their forward portion to the body of chuck 19 and along their radially inward edge to bosses 27.

Figure 2:
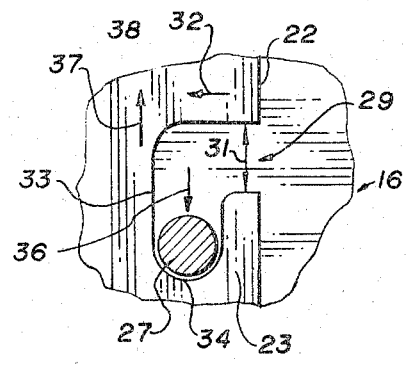
FIGURE 2 is a fragmentary view as indicated by the line 2—2 in FIGURE 1.

With reference to FIGURE 2 the outermost periphery of chuck 16 is cut with L-shaped grooves indicated generally at 29 which are also positioned to correspond to each of bosses 27 located on and extending radially inwardly from chuck 19. The width of both portions of each groove is indicated by dimension 31 and makes the groove wide enough to permit slidable passage of boss 27. Accordingly, chuck 19 may be slipped into place over chuck 16 by aligning each boss 27 with a corresponding groove 29, and thrusting the entire chuck in the direction indicated by arrow 32. When each boss encounters opposite wall 33 of the second portion of groove 29 at right angles to the initial portion, the chuck is then rotated in the direction of arrow 36 so that each boss 27 is seated against terminus 34 at the end of the second portion of each groove 29. Each terminus 34 is located away from the first portion of the groove in a direction opposite to the direction indicated by arrow 37, the latter indicating the direction of rotation of the driving head, spindle and chucks when logs are being cut or otherwise processed in the lathe.

After the various chuck or chucks 10, 16 and 19 have been placed in concentric position on the powered spindle indicated at A, so that all rotating elements have a common axis of concentricity C, a log may be placed in the lathe between the spindle and a standard holding post which also supports a chuck or chucks similar to that at the power spindle, a conventional arrangement and not shown in the drawings, and then forcibly engaged against the holding teeth 11, 12 or 15a and b of the chucks. If the log is of a relatively small diameter, chuck 19 may be entirely omitted from the above assembly, and the log will be engaged for driving by teeth 11 or 12 or both. If an old growth log is encountered, even one that has a complete heart or outer portion, it is preferable to have the teeth of the engaging chuck enter the log near its outer periphery to assure proper power rotation while cutting. To accomplish this, the operator may quickly and easily slide large diameter chuck 19 into place by following the procedure outlined in greater detail above. As is often the case with old growth logs of larger diameter, the heart or center portion of the log may be rotted out or otherwise weakened in which case it is necessary to have a larger diameter chuck such as 19 to grasp and power rotate the log by engaging it with chuck teeth near its outer periphery.

Although chuck 19 is easily attached to the rotating head by slipping on in the manner described, there is no tendency of the chuck to become disengaged during log processing. This is so because boss 27 is restrained in that portion of slot 29 which permits no movement of the chuck laterally with respect to the axis of rotation of the work being turned, i.e., in a direction opposite to that of arrow 32. Moreover, during rotation of the work in the direction of arrow 37, the inertia of the work being rotated tends to force boss 27 back against terminus portion 34 of groove 29 which prevents disengagement. It is to be noted that the oppositely mounted chuck on the holding post, such chuck being driven by the rotation of the log, is arranged to have its bosses 27 fit into slots similar to 29 on an idler member except that the direction of the portion of such slots which restrain movement of the boss are oriented in a direction opposite to those of slot 29.

Also, it is to be noted that although chuck 19 has been described as having three bosses 27 for engagement in properly spaced grooves or slots 29, the total number of such members may be either increased or decreased without altering the basic concept of my invention.

To disengage chuck 19, power rotation is stopped and the operator turns the chuck in a direction opposite to the direction indicated by arrow 36, and, after each boss 27 has been aligned with the forward portion of a groove 29 by striking wall 38, the bosses 27 may be slid outwardly through the groove passage in a direction opposite to that indicated by arrow 32.

Although the above description has been set forth in some detail for purposes of clarity of understanding and by way of illustration, certain modifications in structure and arrangement of parts and function may be made within the scope of this invention and the appended claim.

I claim:

A chucking device adapted for use with a log veneering lathe including a multiple-toothed head member adapted to rotate about a central axis, said member having at its outwardly extending end a first circular surface normal to said central axis and including a plurality of teeth, said member being further provided with an annular shoulder of greater outer diameter than said first surface and displaced rearwardly from said first surface; and a ring-shaped, multiple-toothed chuck member having a toothed surface and a second surface, said second surface defining a first circular opening of sufficient diameter to receive said first surface and said annular shoulder, said toothed surface defining a second circular opening coaxially aligned with said first circular opening and of sufficient diameter to receive said first surface, said first and second circular openings defining an annular seat within said chuck member spaced from said toothed surface a distance corresponding to the rearward displacement of said annular shoulder from said first surface, said annular shoulder being further provided with a plurality of spaced L-shaped slots opening towards said outwardly-extending end, the internal leg of said L-shaped slot being substantially parallel to said first surface, said chuck member being further provided with correspondingly-spaced boss means aligned to releasably engage said L-shaped slots in said annular shoulder, said slots and boss means defining means for releasably interconnecting said head member and said chuck member so that when said head member is positioned with said annular shoulder abutting said annular seat, said first and toothed surfaces will be coplanar and the teeth of said members will be positioned to simultaneously grip a log.

References Cited

UNITED STATES PATENTS

| | | | |
|---|---|---|---|
| 129,705 | 7/1872 | Archer | 142—53 |
| 894,634 | 7/1908 | Hardinge | 82—33 X |
| 2,879,816 | 3/1959 | Cook et al. | 144—209 |

DONALD R. SCHRAN, *Primary Examiner.*